US012561644B2

(12) United States Patent
Chen

(10) Patent No.: US 12,561,644 B2
(45) Date of Patent: Feb. 24, 2026

(54) SMART ORDER SCHEDULING LEVERAGING REAL-TIME FULFILLMENT SITE CAPACITY DATA

(71) Applicant: Express Scripts Strategic Development, Inc., St. Louis, MO (US)

(72) Inventor: Xia Chen, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 358 days.

(21) Appl. No.: 18/124,784

(22) Filed: Mar. 22, 2023

(65) Prior Publication Data

US 2024/0320613 A1      Sep. 26, 2024

(51) Int. Cl.
G06Q 10/087 (2023.01)
G06Q 10/083 (2023.01)

(52) U.S. Cl.
CPC ....... G06Q 10/087 (2013.01); G06Q 10/0838 (2013.01)

(58) Field of Classification Search
CPC ......................... G06Q 10/087; G06Q 10/0838
USPC ......................................................... 705/28
See application file for complete search history.

(56) References Cited

U.S. PATENT DOCUMENTS

| | | | |
|---|---|---|---|
| 7,398,217 B2 | 7/2008 | Lewis | |
| 8,050,956 B2 * | 11/2011 | Abo-Hasna | G06Q 10/063114 |
| | | | 705/7.22 |
| 9,910,959 B2 | 3/2018 | High | |
| 10,734,106 B2 | 8/2020 | Doherty | |
| 10,803,148 B2 | 10/2020 | High | |
| 11,232,399 B1 * | 1/2022 | Calvin | G06Q 10/087 |
| 11,544,810 B2 * | 1/2023 | Rao | G06Q 10/067 |
| 11,593,710 B1 * | 2/2023 | Snopek | G16H 20/10 |
| 11,900,228 B1 * | 2/2024 | Snopek | G06Q 10/087 |
| 12,087,418 B1 * | 9/2024 | Armstrong | G06Q 10/087 |
| 2013/0041675 A1 | 2/2013 | Cunningham | |
| 2013/0325511 A1 | 12/2013 | Neagle, III | |
| 2014/0240725 A1 | 8/2014 | Banfield | |
| 2014/0278492 A1 | 9/2014 | Silver | |
| 2016/0371459 A1 | 12/2016 | Minemura | |
| 2017/0132393 A1 | 5/2017 | Natarajan | |
| 2021/0142267 A1 * | 5/2021 | Farias | G06Q 10/087 |
| 2022/0139518 A1 * | 5/2022 | Shawver | G06N 20/00 |
| | | | 705/2 |
| 2023/0290466 A1 * | 9/2023 | Williams | H04L 67/10 |
| 2023/0290472 A1 * | 9/2023 | Siegel | G16H 20/10 |

FOREIGN PATENT DOCUMENTS

WO      WO-03042894 A1 *   5/2003   ......... G06Q 30/0283

* cited by examiner

*Primary Examiner* — Russell S Glass
(74) *Attorney, Agent, or Firm* — Jordan IP Law PC

(57)      ABSTRACT

Apparatuses, systems, and methods relate to technology to receive an electronic request from a user device of a user to fill a prescription, identify that the prescription is associated with a first medicine, identify a first pharmacy that is capable of providing the first medicine, and predict site capacities for the first pharmacy for a plurality of dates. The technology further determines a subset of dates from the plurality of dates based on the site capacities, determines delivery dates for the first medicine based on the subset of dates, and provides the delivery dates to the user device.

19 Claims, 10 Drawing Sheets

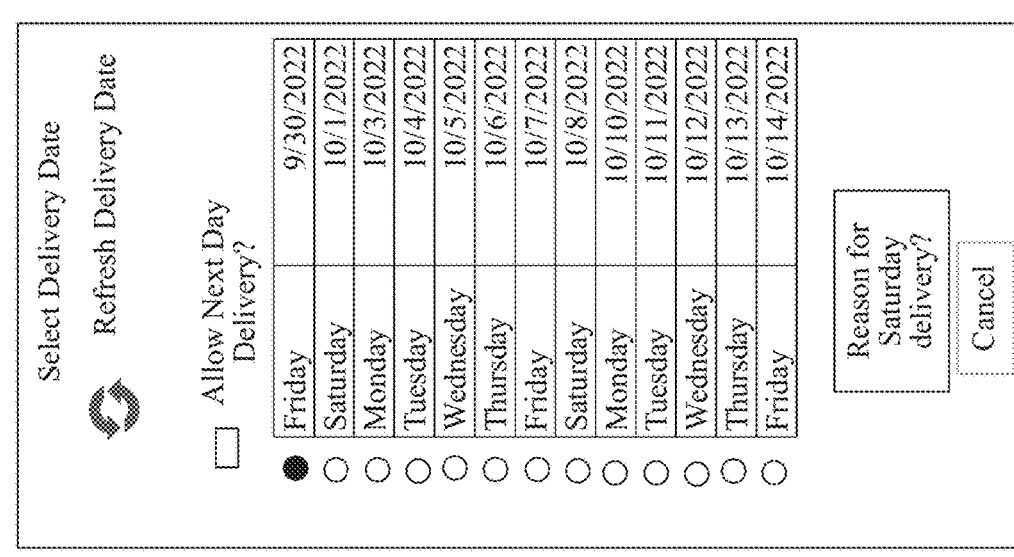

150 —

Select Delivery Date

🔄 Refresh Delivery Date

☐ Allow Next Day Delivery?

| | | |
|---|---|---|
| ● | Friday | 9/30/2022 |
| ○ | Saturday | 10/1/2022 |
| ○ | Monday | 10/3/2022 |
| ○ | Tuesday | 10/4/2022 |
| ○ | Wednesday | 10/5/2022 |
| ○ | Thursday | 10/6/2022 |
| ○ | Friday | 10/7/2022 |
| ○ | Saturday | 10/8/2022 |
| ○ | Monday | 10/10/2022 |
| ○ | Tuesday | 10/11/2022 |
| ○ | Wednesday | 10/12/2022 |
| ○ | Thursday | 10/13/2022 |
| ○ | Friday | 10/14/2022 |

Reason for Saturday delivery?

Cancel

142 —

Select Delivery Date

🔄 Refresh Delivery Date

☐ Allow Next Day Delivery?

| | | |
|---|---|---|
| ○ | Saturday | 10/1/2022 |
| ○ | Tuesday | 10/4/2022 |
| ● | Thursday | 10/6/2022 |
| ○ | Saturday | 10/8/2022 |
| ○ | Monday | 10/10/2022 |
| ○ | Wednesday | 10/12/2022 |
| ○ | Thursday | 10/13/2022 |
| ○ | Friday | 10/14/2022 |

Reason for Saturday delivery?

Cancel

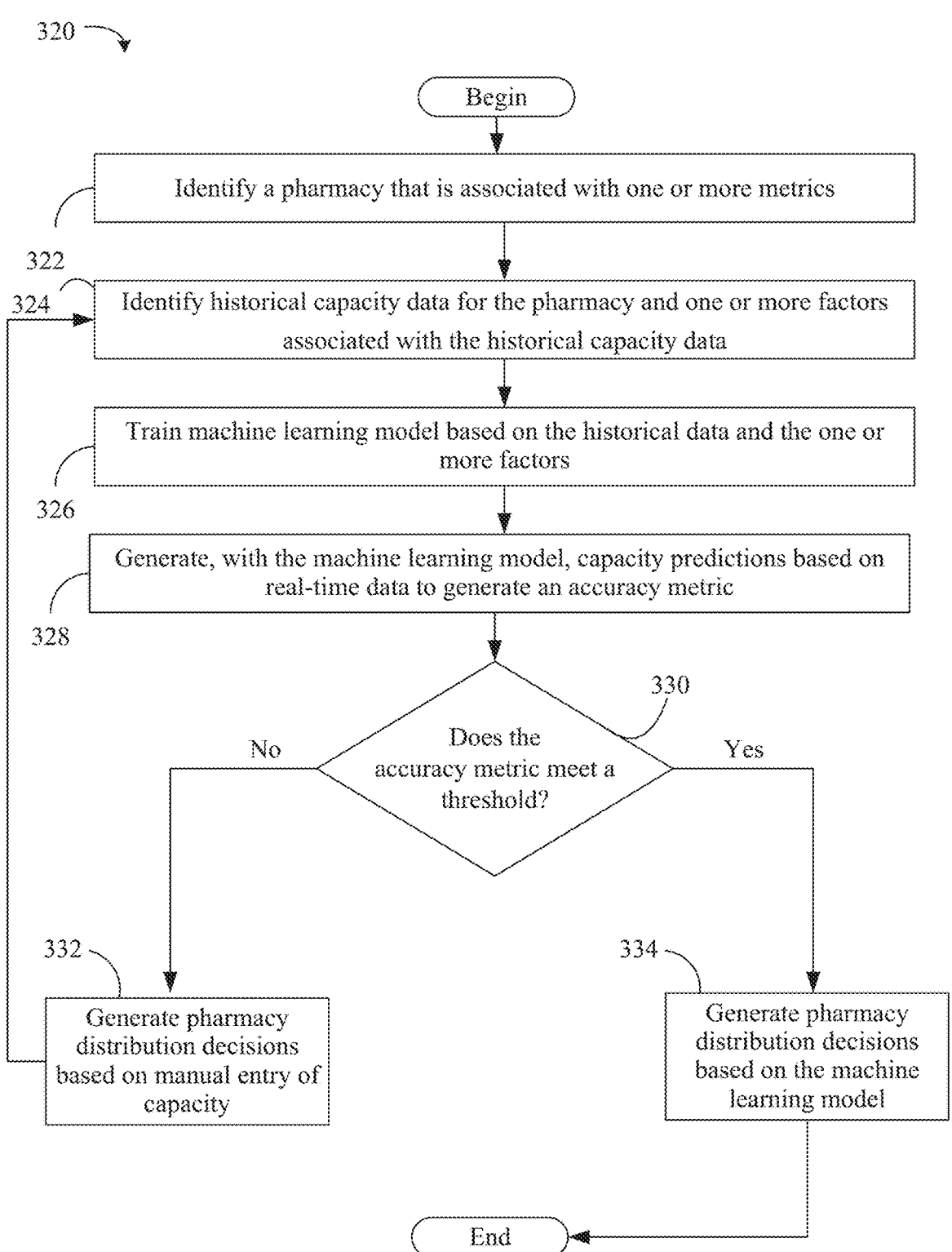

Begin

Identify a pharmacy that is associated with one or more metrics

322

324    Identify historical capacity data for the pharmacy and one or more factors associated with the historical capacity data Train machine learning model based on the historical data and the one or more factors

326

Generate, with the machine learning model, capacity predictions based on real-time data to generate an accuracy metric

328

330    Does the accuracy metric meet a threshold?

No    Yes

332    Generate pharmacy distribution decisions based on manual entry of capacity 334    Generate pharmacy distribution decisions based on the machine learning model End

Begin

Generate a list of medications for a pharmacy

422

424  Identify one or more medications from the list that have a supply above a threshold and an expiration within a threshold Filter orders to prioritize the one or more medications to earlier dates and shift other medications to later dates

426

End

500

Prescription Refill
512

Frontend Pharmacy Interface
502

CRM
504

IVR
506

Web/mobile interface
526

RxHome
508

Automated Process
510

Rules and Configurations Module
514

General Rules
516

Order Rules
518

Claim Rules
520

Shipment Rules
522

Data Rules
524

Pharmacy API platform
522

Backend Pharmacy for Fulfillment Dispensing
524

SMART ORDER SCHEDULING LEVERAGING REAL-TIME FULFILLMENT SITE CAPACITY DATA

TECHNICAL FIELD

The present disclosure relates to physical fulfillment systems and, more particularly, to physical fulfillment systems that package a wide variety of items for shipment. In detail, examples generally relate to analyzing site capacities for a fulfillment system and forming decisions based on the site capacities in real-time.

BACKGROUND

Currently, entities such as pharmacy benefit managers (PBMs) offer mail order drug programs. For example, a user can order a prescription drug, to be fulfilled at a pharmacy, and have the prescription drug mailed to the user's residence. In order to do so, a pharmacy can employ pharmacists who review the prescriptions and fill the prescriptions. Shippers then ship the prescriptions to the user's residence.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

FIG. 1B is a diagram of an example of a real-time delivery date list according to an embodiment;

FIG. 3 is a flowchart of an example of a method of identifying a pharmacy that is associated with one or more metrics according to an embodiment;

DETAILED DESCRIPTION

Examples as described herein relate to an enhanced and secure technological environment to deliver items to a user. In detail, examples relate to predicting site capacities (e.g., how many prescriptions can be fulfilled and mailed) of a plurality of fulfillment sites (e.g., mail-order pharmacies) to accurately identify when a prescription can be fulfilled based on a multitude of predictive factors. Users may thus be advised and select accurate dates that medicines can be fulfilled. Doing so may increase efficiency on several different levels.

For example, conventional implementations fail to predict site capacities and may thus allow users to select fulfillment dates which cannot be met due to overcapacity on the selected fulfillment dates resulting in missed commitments. When such situations arise, a significant amount of effort and/or computing resources must be exerted to notify the users that the selected fulfillment dates cannot be met and rearrange workflows to provide the delayed medicines as soon as possible. Moreover, such delays can cause significant spoilage in medications that are prepared to be shipped, but cannot do so due to constraints. Furthermore, delaying the shipment of medicine may pose a significant difficulty for the users who may rely on the medications to control various health conditions, and naturally rely on timely delivery of such medications.

Examples as described may reduce the occurrence of such situations altogether thus increasing efficiency and reducing the amount of resources to fulfill orders by integrating frontend pharmacies with backend pharmacies. To do so, examples herein employ several technological enhancements to predict fulfillment sites and capacities of the fulfillment sites. For example, a whole host of factors may contribute to a capacity of a pharmacy. Examples herein can analyze the various factors and combine the factors together into a metric representing the capacity of a fulfillment site. Furthermore, examples may do so in real-time to accurately guide fulfillment dates. Doing so in real-time would be impossible to execute by a human being, and removes subjective analysis and errors that can skew the metric. In order to accomplish the above, examples, receive an electronic request from a user device of a user to fill a prescription, identify that the prescription is associated with a first medicine, identify a first pharmacy that is capable of providing the first medicine, predict site capacities for the first pharmacy for a plurality of dates, determine a subset of dates from the plurality of dates based on the site capacities, determine delivery dates for the first medicine based on the subset of dates, and provide the delivery dates to the user device.

Figure 1A:
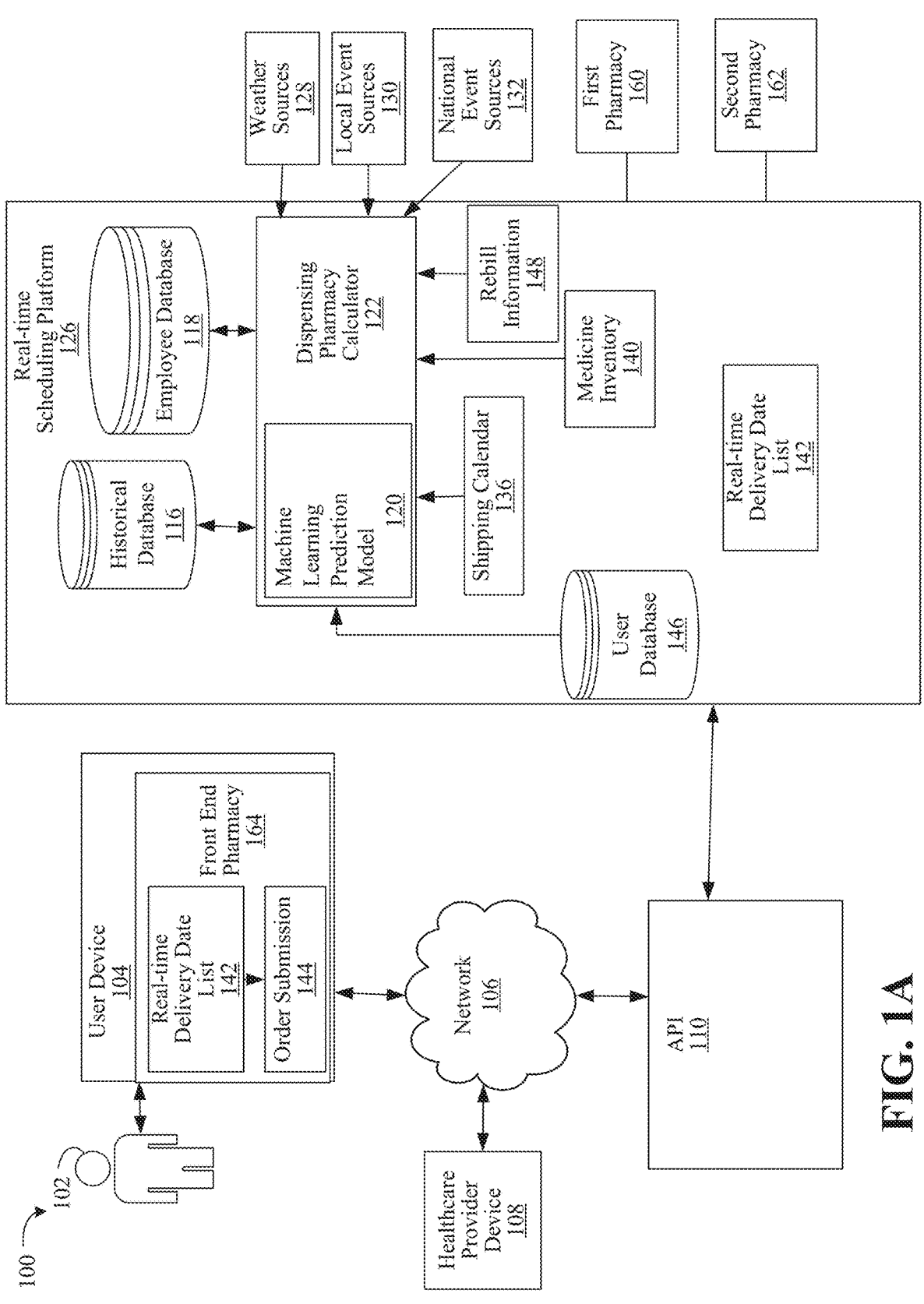
FIG. 1A is a diagram of an example of a smart scheduling process according to an embodiment.

Turning now to FIG. 1A, a smart scheduling process 100 is illustrated to schedule a fulfillment (e.g., a refill and/or fill) of a prescription of a user 102. A first pharmacy 160 or second pharmacy 162 can fulfill the prescription. The first pharmacy 160 and second pharmacy 162 may be home delivery pharmacies or mail order delivery pharmacies that mail prescription medications and other medications to consumers.

To schedule a delivery, the user 102 may access user device 104. The user device 104 can be a computing device, a mobile device, server, desktop, tablet, etc. The user device 104 can present a graphical user interface (GUI) to the user 102 to display a front end pharmacy 164. The user 102 can interact with the GUI (e.g., make selections and provide data) to select a medicine for fulfillment. Initially the user 102 may select the medicine for the fulfillment through the GUI. The selected medicine is transmitted over the network 106 to an API 110, which in turn passes the selected medicine to a real-time scheduling platform 126.

The network 106 can include, or operate in conjunction with, an ad hoc network, an intranet, an extranet, a virtual private network (VPN), a local area network (LAN), a wireless network, a low energy Bluetooth (BLE) connection, a WiFi direct connection, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network and the coupling can be a Code Division Multiple Access (CDMA) connection, a Global System for Mobile communications (GSM) connection, or other type of cellular or wireless coupling. In this example, the coupling can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The real-time scheduling platform 126 can identify dates for delivering the medicine. In order to do so, a number of disparate factors can be considered, harmonized and analyzed to generate final delivery dates.

The first pharmacy 160 can be a high volume, specialty pharmacy which has a certain number of employees (e.g., pharmacists) above a threshold, and is capable of providing numerous different specialized medicines and/or therapies. For example, the first pharmacy 160 may have licenses to distribute certain medications. The second pharmacy 162 can be a low volume pharmacy with less employees and a limited number of medicines and/or therapies. For example, the second pharmacy 162 may lack the licenses and is unable to distribute the certain medications.

In this example, the real-time scheduling platform 126 can determine if the first and second pharmacies 160, 162 are capable of filling the medicine. To do so, the first pharmacy 160 can provide a first list of therapies and/or medicines that the first pharmacy 160 can distribute. Similarly, the second pharmacy 162 can provide a second list of therapies and/or medicines that the second pharmacy 160 can distribute. The real-time scheduling platform 126 can compare the medicine to the first list and determine if the medicine is listed in the first list. If so, the first pharmacy 160 can distribute the medicine. If the medicine is not in the first list, the first pharmacy 160 cannot distribute the medicine and is excluded from further consideration. Similarly, the real-time scheduling platform 126 can compare the medicine to the second list to determine if second pharmacy 162 can distribute the medicine.

In this example, the real-time scheduling platform 126 determines that the first pharmacy 160 can distribute the medicine. Furthermore, the real-time scheduling platform 126 determines that the second pharmacy 162 cannot distribute the medicine and is therefore excluded from further scheduling analysis. Thus, the below analysis applies to the first pharmacy 160 and not the second pharmacy 162. Determining whether the first and second pharmacies 160, 162 can distribute the medicine at the outset can reduce computational workloads by focusing computational resources on the first pharmacy 160 which can provide the medicine and bypassing the second pharmacy 162 from further consideration. That is, since the second pharmacy 162 will be unable to distribute the medicine so examples do not determine the predicted site capacity and/or remaining site capacity of the second pharmacy 162. The predicted site capacity can mean the maximum amount of prescriptions that can be fulfilled and mailed on a date, and the remaining site capacity can be a difference between the predicted site capacity for a given date and a number of prescriptions that are registered to be shipped on the given date.

The real-time scheduling platform 126 can include a dispensing pharmacy calculator 122 that determines a predicted site capacity (e.g., how many prescriptions can be fulfilled) for each date of a plurality of dates. The real-time scheduling platform 126 can be a computing device, computing architecture, server, etc.

The dispensing pharmacy calculator 122 can access the user database 146 to retrieve details of the user 102. For example, as noted above, the user 102 requested medicine. The user database 146 can maintain whether the user 102 previously ordered the medicine, and if so, a first date that the previously ordered medicine will be exhausted. The dispensing pharmacy calculator 122 can calculate predicted site capacities for different dates within a time frame of the first date. That is, the dispensing pharmacy calculator 122 can access the user database 146 to retrieve user data, where the user data includes a previous fulfillment date for the prescription (e.g., medicine), and determine shipment/delivery dates (e.g., a subset of dates) based on the previous fulfillment date.

To determine the predicted site capacity, several different factors are considered and analyzed. For example, a dispensing pharmacy calculator 122 can analyze the different factors to arrive at a site capacity for each date of a plurality of dates. It is worthwhile to note that the machine learning (ML) prediction model 120 can receive the factors described below to determine shipment as well as delivery dates. For example, the ML prediction model 120 can analyze a number of factors in real-time to identify connections between the factors that influence shipment and delivery dates.

A first factor can relate to the employees of the first pharmacy 160. The real-time scheduling platform 126 can access the employee database 118 to identify employee data. For example, certain employees may have higher production than other employees. Therefore, some examples may maintain records pertaining to employee production. For example, the real-time scheduling platform 126 may identify which employees are working on a given date, average historical production of each of the employees and a summation of the average historical productions. The summation can be provided as a first factor to the dispensing pharmacy calculator 122 to determine a predicted site capacity for the given day.

A second factor can be determined from historical data of a historical database 116 associated with the first pharmacy. The historical data can indicate how many prescriptions the first pharmacy fulfilled on certain dates, days of the week, seasons, etc. For example, fluctuations occur throughout the course of a workweek. Some examples can identify a typical historical output of the pharmacy on a given time period (e.g., a day) and generate a correlation between the time period and the typical historical output. The historical data can further include trends for a class of drugs, e.g., seasonal allergy drugs or influenza-related drugs. In an example embodiment, the historical data can include related to seasonal pediatric drugs. These historical data examples can be used as factors in the ML engine to produce a prediction model. For example, the ML prediction model 120 can be trained on the historical data to generate correlations between different dates, different drug types, and site capacities, and determine the predicted site capacities based on the correlations. The correlations can be the second factor and can be used to weight, for example, the summation described above.

In some examples, the dispensing pharmacy calculator 122 can access weather sources 128 (e.g., websites, local news forecasts, etc.) and employ natural language processing (NLP) to analyze the weather to determine whether negative weather will impact the maximum site capacity for the first pharmacy 160. For example, if a tornado is predicted to occur in the vicinity of the first pharmacy during normal work hours, it can be inferred that production for that date will drop if not be zero altogether. As another example, if a violent storm is predicted to provide difficulties to the first pharmacy 160, the predicted site capacity can be reduced. Thus, the predicted site capacity can be determined based on a weather factor to decrease/increase the predicted site capacity based on inclement weather/mild weather respectively.

Some examples may further analyze local events 130 (e.g., web pages sharing local information near the first pharmacy, epidemic), to determine if local events may influence the predicted site capacity of the first pharmacy 160. That is, the dispensing pharmacy calculator 122 can employ NLP to analyze local news sources (e.g., sources that focus on news within a predetermined geographic distance of the first pharmacy) for information. For example, if a local event (e.g., minor league game, parade, etc.) is scheduled during a time period, the maximum site capacity may be negatively impacted as employees can become distracted, leave early to participate in the local event, etc. Thus, the predicted site capacity can be determined based on whether local events are occurring. For example, the summation described above can be weighted based on the local event data.

Some examples may further employ NLP analyze national event sources 132 (e.g., web pages sharing national information, etc.), to determine if national events could influence the predicted site capacity of the first pharmacy. That is, the dispensing pharmacy calculator 122 can employ NLP to analyze national news sources (e.g., sources that focus on news within a country) for information. For example, if a national event (e.g., Superbowl, parade, etc.) is scheduled during a time period, the maximum site capacity can be impacted around the time period. For example, the day of a national event and after can have significantly diminished productivity from employees. Thus, the predicted site capacity can be determined based on the national event data. In some examples, the national event may be analyzed to determine if productivity diminished the date of the national event, after the national event or both, and adjust the predicted site capacity accordingly.

Some examples further access a medicine inventory 140. For example, if the requested medicine is out-of-stock, the fulfillment dates may be pushed until the requested medicine is scheduled to be restoked. In some cases, the first pharmacy 160 may be excluded from further consideration if the medicine is unavailable.

Thus, the dispensing pharmacy calculator 122 may identify predicted site capacities of the first pharmacy 160. The real-time scheduling platform can further identify a shipping calendar 136 of the first pharmacy 160. A capture capacity and injection capacity may be derived from the shipping calendar 136. Capture capacity can include actively identifying pharmacy resources that are underused and redeploying those resources in a more efficient manner, e.g., using less than all of a single pharmacy resource such that pharmacy resources that are being used operate with greater efficiency. Injection capacity can measure the increase in capacity the pharmacy system can implement in a timely manner. The shipping calendar 136 may further include a number of medicines that are already scheduled to be shipped on certain dates. The number of medicines that are scheduled to be shipped on a specific date can be subtracted from the predicted site capacity of the first pharmacy 160 on the specific date (e.g., a maximum number of medicines that may be shipped) to determine remaining site capacities.

That is, once the predicted maximum capacities are determined, the data from the shipping calendar 136 (e.g., orders to be fulfilled on some dates) may be subtracted from the predicted maximum capacities to determine how much of the maximum capacity is currently already scheduled for other medicine refills. Thus, a remaining capacity is identified based on the predicted maximum capacities and the orders to be fulfilled. For example, the dispensing pharmacy calculator 122 can identify amounts of existing pharmacy orders associated with the first pharmacy 160 for a plurality of dates, and determine remaining site capacities based on the amounts of existing pharmacy orders and the predicted site capacities. The dispensing pharmacy calculator 122 can determine which dates have remaining site capacities that are above a threshold to determine whether to make such dates available for shipment. The following table provides a data structure that can be generated to contain the various capacities of the first pharmacy 160 on several dates:

TABLE I

| Date | Predicted Maximum Capacity | Existing Order (Orders to be Fulfilled) | Remaining Site Capacity |
|---|---|---|---|
| Sep. 30, 2022 | 500 | 500 | 0 |
| Oct. 1, 2022 | 600 | 420 | 180 |
| Oct. 3, 2022 | 622 | 622 | 0 |
| Oct. 4, 2022 | 572 | 570 | 2 |

If the predicted remaining capacities are above a threshold, more orders may be processed and shipped on corresponding dates. That is, each predicted remaining capacity corresponds to one date, and thus indicates availability to add further medicine orders to that one date. In some examples, the threshold may be zero. In some examples, the threshold may be set to a number greater than zero so that the first pharmacy has some level of flexibility in case the first pharmacy underproduces (e.g., employees are sick, delayed medical shipments, etc.) and/or for emergency medicine fulfillment. In Table I, the threshold is set to zero, such that no further prescription orders can be accepted for dates Sep. 30, 2022 and Oct. 3, 2022. Prescription orders can be accepted for Oct. 1, 2022 and Oct. 4, 2022. A similar such table can be generated for each pharmacy. Furthermore, the Table I can be extended to include further dates.

For example, emergency medicine orders can be unpredictable by nature. An emergency medicine order is often placed when an unpredicted event (e.g., Covid outbreak, natural disaster, supply chain interruption, etc.) occurs and a customer is unable to obtain a needed medication. While such events are unpredictable, it can be possible to assume/predict that a certain number of orders will be related to emergency medication. For example, while it would be difficult to specifically identify that in December, a specific location will experience a blizzard disrupting supply chains, it can be predicted that such a blizzard will occur in the United States during December, causing a certain number of emergency orders although perhaps the precise location is unknown.

The ML prediction model 120 can be trained to identify trends in emergency orders (e.g., daily, weekly, monthly, seasonal fluctuations) based on data from the historical database 116, and dynamically adjust the threshold based on an anticipated number of emergency orders. For example, the historical database 116 can include data relating to the number of emergency orders that were filled during previous years. The threshold can be set to provide enough capacity to fulfill an anticipated amount of emergency orders as predicted by the ML prediction model 120. Thus, the ML model 120 can predict an amount of emergency orders that will be placed in the future for the first pharmacy 160, and set the threshold based on the amount of emergency orders.

If a date has a remaining capacity above the threshold, the date may be identified as a potential shipment date. The actually delivery date will occur after the shipment date due to transit time. Thus, the delivery date can be determined based on the shipment date and an amount of time (e.g., expected number of days) that the medicine will remain in transit before arriving at a location of the user 102.

Thus, each of the predicted shipment dates can form the basis of a delivery date. The delivery date can be determined by adding the transit time to the predicted shipment date. The delivery dates may be stored as a real-time delivery date list 142 so that the user 102 can easily understand when the medicine will arrive.

Some examples further consider rebill information 148. The rebill information 148 indicates whether the user 102 has authorized payment. If so, the real-time scheduling platform 126 may not request billing updates from the user 102 and can immediately ship the medicine. If the rebill information 148 indicates that no authorized payment exists, the dispensing pharmacy calculator 122 can calculate a time to process the billing information, and adjust the real-time deliver date list 142 (further discussed below) based on the time since the medicine will not be shipped prior to payment.

The dispensing pharmacy calculator 122 can also adjust the delivery dates based on the weather sources 128. For example, the pharmacy calculator 122 can automatically access predictive weather sources (e.g., online sources, websites, etc.) to predict the weather. Some examples may employ NLP to identify meaning from online resources and text. The weather may be utilized to predict local disruptions to mail delivery services. For example, if a blizzard is predicted to occur along a shipping path to the user 102 from the first pharmacy, some examples will reasonably predict that shipments along the first path will be delayed. Therefore, some examples may map an entire predicted shipping path from the first pharmacy 160 to a delivery address of the user 102, predict weather along the shipping path and determine whether the weather will impact a delivery date. In some examples, a major weather event (e.g., hurricane) can be predicted to cause nationwide disruptions commercial air transportation, and delivery dates can be adjusted based on the same.

The user device 104 displays a GUI to present the real time delivery date list 142 to the user 102. The user 102 may select a date of the dates from real-time delivery date list 142. The selected date may be stored as the order submission 144. The order submission 144 may then be transmitted to the real-time scheduling platform 126 which schedules a shipment date to process and mail the medicine to the user 102 from the first pharmacy 160 so that the medicine arrives on selected date.

Notably, the above process can occur in real-time. That is, the user 102 can schedule the medicine delivery in real-time. While a user 102 and user device 104 is mentioned above, it will be understood that the healthcare provider device 108 may operate similarly. The network 106 may be any type of communication network (e.g., internet).

FIG. 1B illustrates the real-time delivery date list 142 as the real-time delivery date list 142 would appear on the GUI of the user device 104. As illustrated several dates between Sep. 30, 2022 and Oct. 14, 2022 are missing as the medicine cannot be delivered on the several dates due to the remaining site capacities of the first pharmacy 160.

A conventional delivery date list 150 is not generated in real-time and hence lacks the ability to remove dates that are unable to be fulfilled. As such, the user may select a first date Sep. 30, 2022 even though the medicine cannot be delivered on Sep. 30, 2022. In this situation, the user 102 would need to be contacted (e.g., electronically) once the error is realized and delivery is pushed into a second delivery date. The second delivery date can be significantly later than the original delivery date of Sep. 30, 2022 since earlier delivery dates can be unavailable when the error is realized. As noted above, such a process is cumbersome, reduces user satisfaction and may utilize significant resources to remedy.

Thus, examples herein are more efficient in that only fulfillment dates that can be met are provided to the user 102 as options. Doing so significantly reduces the number of man-hours needed to fulfill medicines, reduces compute resources and enhances consumer satisfaction.

Figure 2:
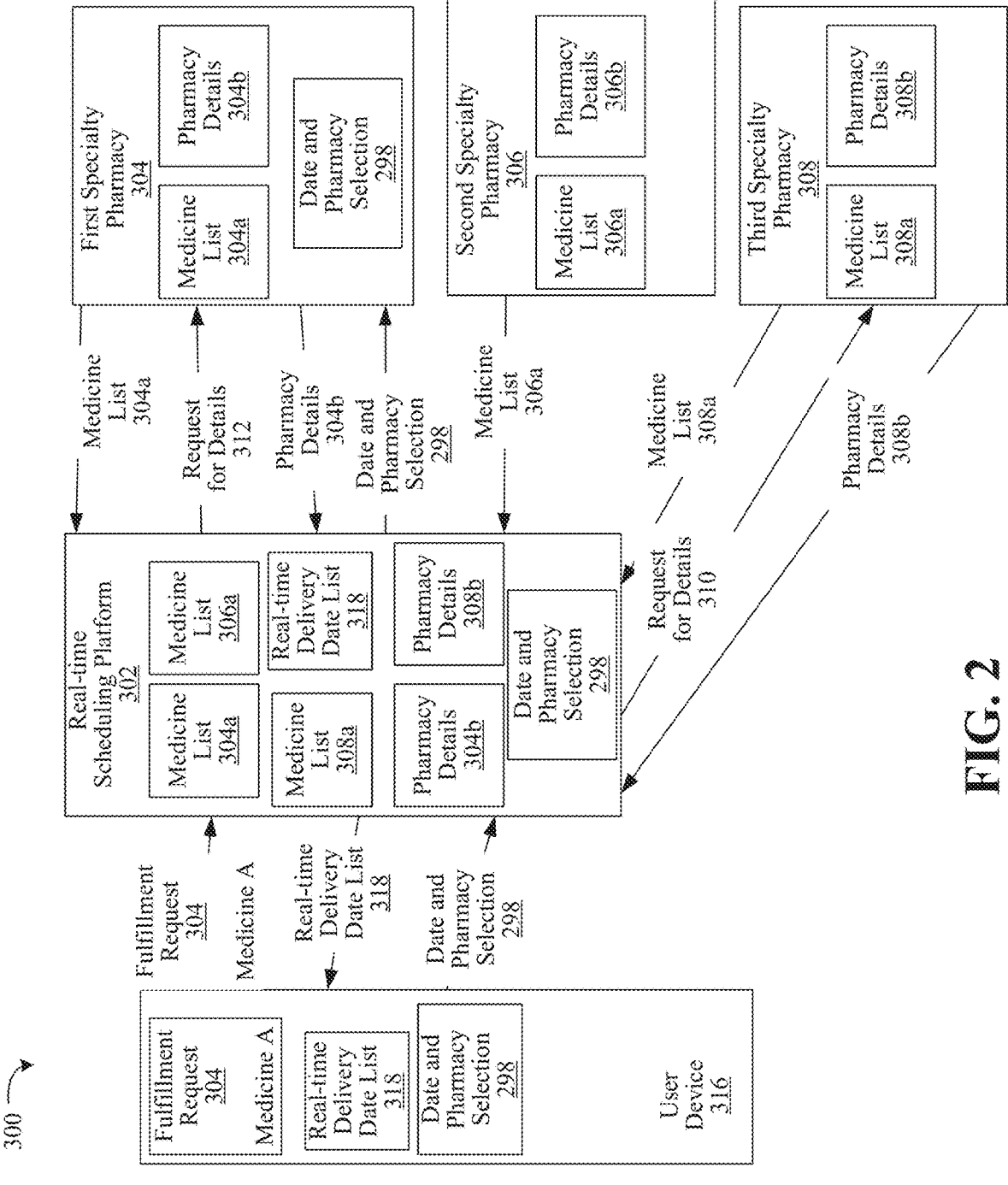
FIG. 2 is a diagram of an example of a process to select a pharmacy according to an embodiment.

FIG. 2 illustrates a process 300 to select a pharmacy from a first specialty pharmacy 304, second specialty pharmacy 306, and third specialty pharmacy 308. The process 300 can generally be implemented in conjunction with any of the embodiments described herein, for example the smart scheduling process 100 (FIGS. 1A and 1B).

Initially, a user may control a user device 316. The user inputs a fulfillment request 304 for a medicine A. The user device 316 transmits the fulfillment request 304 to a real-time scheduling platform 302. The real-time scheduling platform 316 may be part of the real-time scheduling platform 126 (FIG. 1).

The real-time scheduling platform 302 may include the capabilities of the first specialty pharmacy 304, the second specialty pharmacy 306, and the third specialty pharmacy 308. For example, a first specialty pharmacy 304 may have a license(s) to dispense certain drugs (e.g., therapies). The medicine list 304a may include all medicines that the first specialty pharmacy 304 may dispense. The medicine list 304a is provided to the real-time scheduling platform 302.

Similarly, a second specialty pharmacy 306 may have a license(s) to dispense certain drugs (e.g., therapies). The medicine list 306a may include all medicines that the second specialty pharmacy 306 may dispense. The medicine list 306a is provided to the real-time scheduling platform 302.

Moreover, a third specialty pharmacy 308 may have a license(s) to dispense certain drugs (e.g., therapies). The medicine list 308a may include all medicines that the third specialty pharmacy 308 may dispense. The medicine list 308a is provided to the real-time scheduling platform 302.

The real-time scheduling platform 302 receives the medicine lists 304a, 306a, 308a. The real-time scheduling platform 302 may extract the medicine A from the fulfillment request 304 and identify whether the first specialty pharmacy 304 is able to dispense the medicine A based on the medicine list 304*a*. Similarly, the real-time scheduling platform 302 can determine if the second specialty pharmacy 306 is able to dispense the medicine A based on the medicine list 306*a*. Similarly, the real-time scheduling platform 302 can determine if the third specialty pharmacy 308 is able to dispense the medicine A based on the medicine list 308*a*.

In this example, the real-time scheduling platform 302 identifies that the first specialty pharmacy 304 and the third specialty pharmacy 308 are capable of providing medicine A. Thus, the second specialty pharmacy 306 is excluded from further consideration. The real-time scheduling platform 302 may then provide a request for details 312, 310 to the first and third specialty pharmacies 304, 308. The details may correspond to site capacities of the first and third specialty pharmacies 304, 308 (e.g., historical data, how many medicines of different types are already scheduled to be shipped on certain dates, employee data, historical data, etc.). The real-time scheduling platform 302 can further access various sources to identify weather, local and domestic events that can impact site capacities of the first specialty pharmacy 304 and the third specialty pharmacy 308.

The real-time scheduling platform 302 may receive the pharmacy details 304*b*, 308*b*. The real-time scheduling platform 302 may identify a plurality of dates that the medicine A may be shipped based on the pharmacy details 304*b*, 308*b*. Further, the real-time scheduling platform 302 may determine delivery dates that the user will receive the first medicine from the first specialty pharmacy 304 or the third pharmacy 308 based on the shipment dates. Each respective delivery date of delivery dates as well as a corresponding pharmacy from the first specialty pharmacy 304 and the third specialty pharmacy 306 that will ship the medicine A for the respective delivery date is presented to the user as the real-time delivery date list 318.

The user may then select one of the dates and a corresponding pharmacy from the first specialty pharmacy 304 and the third specialty pharmacy 306. The selected one of the dates and corresponding pharmacy is stored as the date and pharmacy selection 298 which is then provided to the real-time scheduling platform 302. The date and pharmacy selection 298 corresponds to the first specialty pharmacy 304 and is therefore provided to the first specialty pharmacy 304. The first specialty pharmacy 304 may then update records to reflect the new addition (delivery of Medicine A to the user).

In some examples, the real-time scheduling platform 302 can also analyze the pharmacy details 304*b*, 308*b* to identify an amount of prescriptions of medicine A that will be distributed for each date and block shipment of further prescriptions of medicine A on the date if the amount exceeds a threshold. For example, suppose that the first specialty pharmacy 304 is scheduled to ship 420 units (e.g., bottles, boxes, vials, etc. of medicine) of medicine A on a first date, and the threshold is set to 400 units. The real-time scheduling platform 302 can automatically determine that first specialty pharmacy 304 should be blocked from shipping any more of medicine A on the first date to avoid inventory complications. If the third specialty pharmacy 308 is scheduled a number of units (e.g., 300) that is under the threshold (e.g., 400) on the date, the third specialty pharmacy 308 is authorized to ship on the first date. In such an instance, the third specialty pharmacy 308 can be presented as an option to the user for a delivery date that is based on the first date.

FIG. 3 illustrates a method 320 of training a ML model to predict site capacities. The method 320 can generally be implemented in conjunction with any of the embodiments described herein, for example the smart scheduling process 100 (FIGS. 1A and 1B) and/or process 300 (FIG. 2). In an embodiment, the method 320 is implemented in logic instructions (e.g., software), configurable logic, fixed-functionality hardware logic, computer readable instructions stored on at least one non-transitory computer readable storage medium that are executable to implement method 320, circuitry, etc., or any combination thereof.

Illustrated processing block 322 identifies a pharmacy that is associated with one or more metrics (e.g., pharmacy is a mail order pharmacy capable of fulfilling certain medicines). Illustrated processing block 324 identifies historical capacity data for the pharmacy and one or more factors (e.g., weather data, local events, national events, a number of employees working, etc.) associated with the historical capacity data. Illustrated processing block 326 trains a ML model based on the historical data and the one or more factors. Thus, the ML model may learn connections between the one or more factors and an impact on site capacity.

Illustrated processing block 328 generates, with the ML model, capacity predictions based on real-time data to generate an accuracy metric. For example, the ML model may receive current data (e.g., current data related to the one or more factors) and make capacity predictions for certain dates of a pharmacy (e.g., prior to those dates actually occurring). The actual capacities of the pharmacy can be tracked and identified after the dates occur. The capacity predictions may be compared to the actual capacities to determine the accuracy metric. The accuracy metric may quantity an accuracy of the capacity predictions of the ML model (e.g., a neural network). For example, the accuracy metric may be higher when the capacity predictions are similar to, within a certain threshold, or the same as the actual capacities.

Illustrated processing block 330 determines if the accuracy metric meets a threshold. If so, illustrated processing block 334 generates pharmacy distribution decisions based on the ML model. Otherwise, illustrated processing block 332 generates pharmacy distribution decisions based on manual entry (e.g., as entered by site operators of the pharmacies) of capacity.

Figure 4:
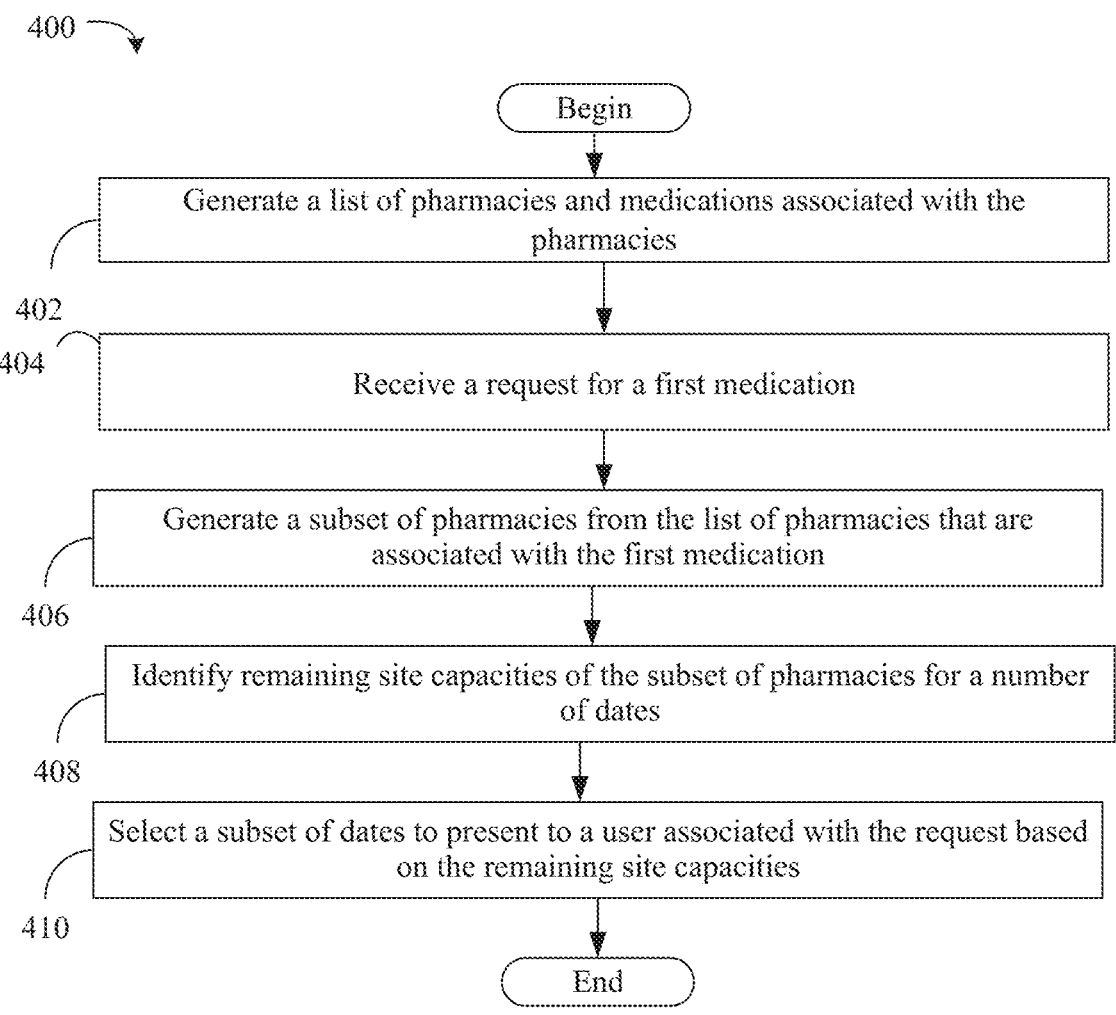
FIG. 4 is a flowchart of an example of a method of providing medication to a user according to an embodiment.

FIG. 4 illustrates a method 400 of providing medication to a user. The method 400 can generally be implemented in conjunction with any of the embodiments described herein, for example the smart scheduling process 100 (FIGS. 1A and 1B), process 300 (FIG. 2) and/or method 320 (FIG. 3). In an embodiment, the method 400 is implemented in logic instructions (e.g., software), configurable logic, fixed-functionality hardware logic, computer readable instructions stored on at least one non-transitory computer readable storage medium that are executable to implement method 400, circuitry, etc., or any combination thereof.

Illustrated processing block 402 generates a list of pharmacies and medications associated with the pharmacies. Illustrated processing block 404 receives a request for a first medication. Illustrated processing block 406 generates a subset of pharmacies from the list of pharmacies that are associated with the first medication (e.g., are able to provide the first medication). Illustrated processing block 408 identifies remaining site capacities of the subset of pharmacies for a number of dates. Illustrated processing block 410 selects a subset of dates to present to a user associated with the request based on the remaining site capacities. For example, processing block 410 may include bypassing dates which have remaining site capacities below a threshold to avoid situations where the pharmacies are over-capacity and cannot fulfill orders in a timely fashion.

Figure 5:
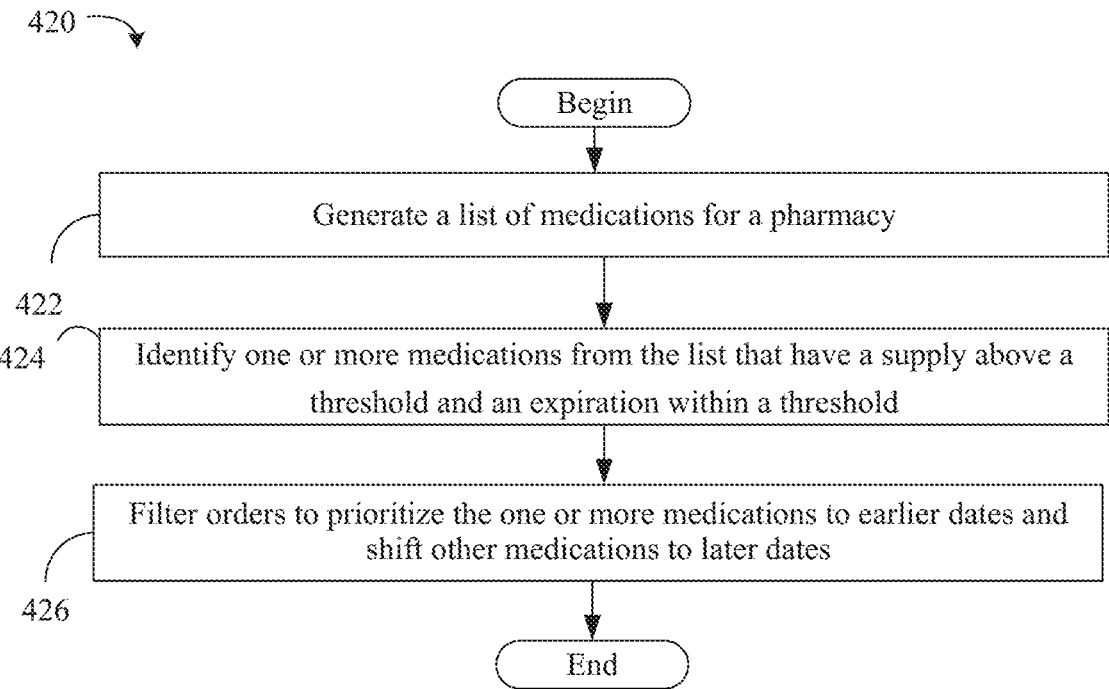
FIG. 5 is a flowchart of an example of a method of prioritizing medication distribution according to an embodiment.

FIG. 5 illustrates a method 420 of prioritizing medication distribution. The method 420 can generally be implemented in conjunction with any of the embodiments described herein, for example the smart scheduling process 100 (FIGS. 1A and 1B), process 300 (FIG. 2), method 320 (FIG. 3) and/or method 400 (FIG. 4). In an embodiment, the method 420 is implemented in logic instructions (e.g., software), configurable logic, fixed-functionality hardware logic, computer readable instructions stored on at least one non-transitory computer readable storage medium that are executable to implement method 420, circuitry, etc., or any combination thereof.

Illustrated processing block 422 generates a list of medications for a pharmacy. Illustrated processing block 424 identifies one or more medications from the list that have a supply above a threshold and an expiration within a threshold. Illustrated processing block 426 filters orders to prioritize the one or more medications to earlier dates and shift other medications to later dates. Doing so can reduce spoilage and waste of medications that would otherwise expire and be unusable.

Figure 6:
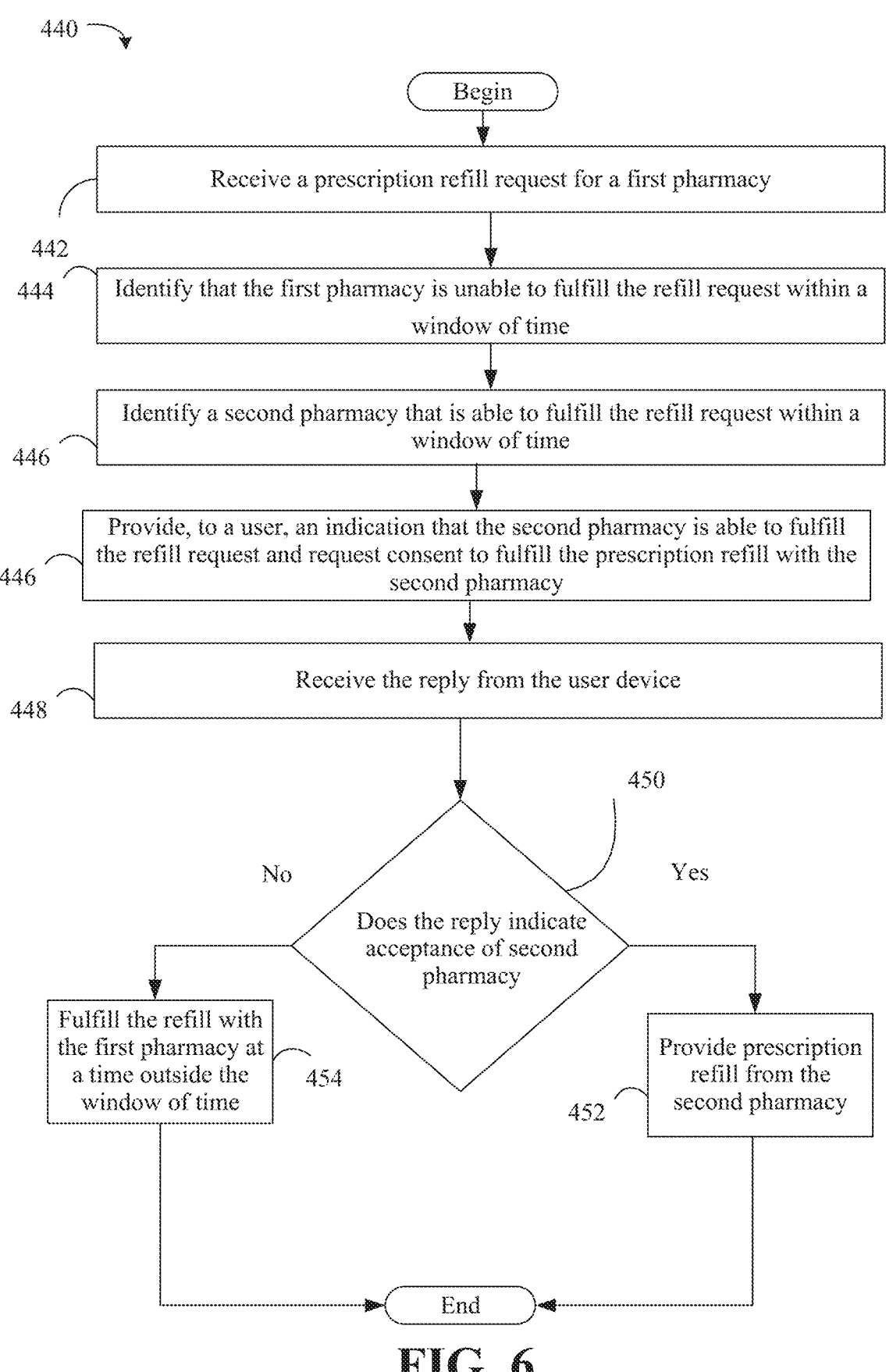
FIG. 6 is a flowchart of an example of a method of shifting medication delivery sites according to an embodiment.

FIG. 6 illustrates a method 440 of shifting medication delivery sites. The method 440 can generally be implemented in conjunction with any of the embodiments described herein, for example the smart scheduling process 100 (FIGS. 1A and 1B), process 300 (FIG. 2), method 320 (FIG. 3), method 400 (FIG. 4) and/or method 420 (FIG. 5). In an embodiment, the method 440 is implemented in logic instructions (e.g., software), configurable logic, fixed-functionality hardware logic, computer readable instructions stored on at least one non-transitory computer readable storage medium that are executable to implement method 440, circuitry, etc., or any combination thereof.

Illustrated processing block 442 receives a prescription refill request for a first pharmacy. Illustrated processing block 444 identifies that the first pharmacy is unable to fulfill the refill request within a window of time. For example, the prescription refill can be a request for a medicine. The window of time can be a time period prior to a user associated with the prescription refill exhausting the medicine. Illustrated processing block 446 identifies a second pharmacy that is able to fulfill the refill request within a window of time. The window of time may be a time period prior to the user finishing the medicine.

Illustrated processing block 446 provides, to a user (e.g., via a user device), an indication that the second pharmacy is able to fulfill the refill request and request consent to fulfill the prescription refill with the second pharmacy. For example, the indication may be displayed on a GUI of the user device. Illustrated processing block 448 receives the reply from the user device. Illustrated processing block 450 determines if the reply indicate acceptance of second pharmacy. For example the user may provide authorization to receive medication from the second pharmacy. If the reply does indicate acceptance, illustrated processing block 452 provides prescription refill from the second pharmacy. Otherwise, illustrated processing block 454 fulfills the refill with the first pharmacy at a time outside the window of time.

Figure 7:
FIG. 7 is a block diagram of an example of a prescription refill processing architecture according to an embodiment.

FIG. 7 illustrates a prescription refill processing architecture 500. The prescription refill processing architecture 500 can generally be implemented in conjunction with any of the embodiments described herein, for example the smart scheduling process 100 (FIGS. 1A and 1B), process 300 (FIG. 2), method 320 (FIG. 3), method 400 (FIG. 4), method 420 (FIG. 5) and/or method 440 (FIG. 6).

A prescription refill 512 is provided to a frontend pharmacy interface 502 (e.g., a website, an application, etc.). The frontend pharmacy interface 502 includes a customer relationship management (CRM) 504 that execute sales campaigns, while also adhering to industry compliance requirements. The frontend pharmacy interface 502 includes an Interactive Voice Response (IVR) 506 to enable voice interaction with a user. The frontend pharmacy interface 502 includes a web/mobile interface 526. The frontend pharmacy interface 502 includes a cloud solution for pharmacy, dispensing physicians, nursing, and reimbursement. The frontend pharmacy interface 502 further includes an automated process 510 to interface with a user and fill prescriptions as described herein.

A rules and configurations module 514 includes several rule modules. The modules include general rules 516, order rules 518, claim rules 520, shipment rules 522 and data rules 524.

The rules and configurations 514 interfaces with a pharmacy API platform 522. A backend pharmacy for fulfillment dispensing 524 interfaces with the pharmacy API platform 522.

Figure 8:
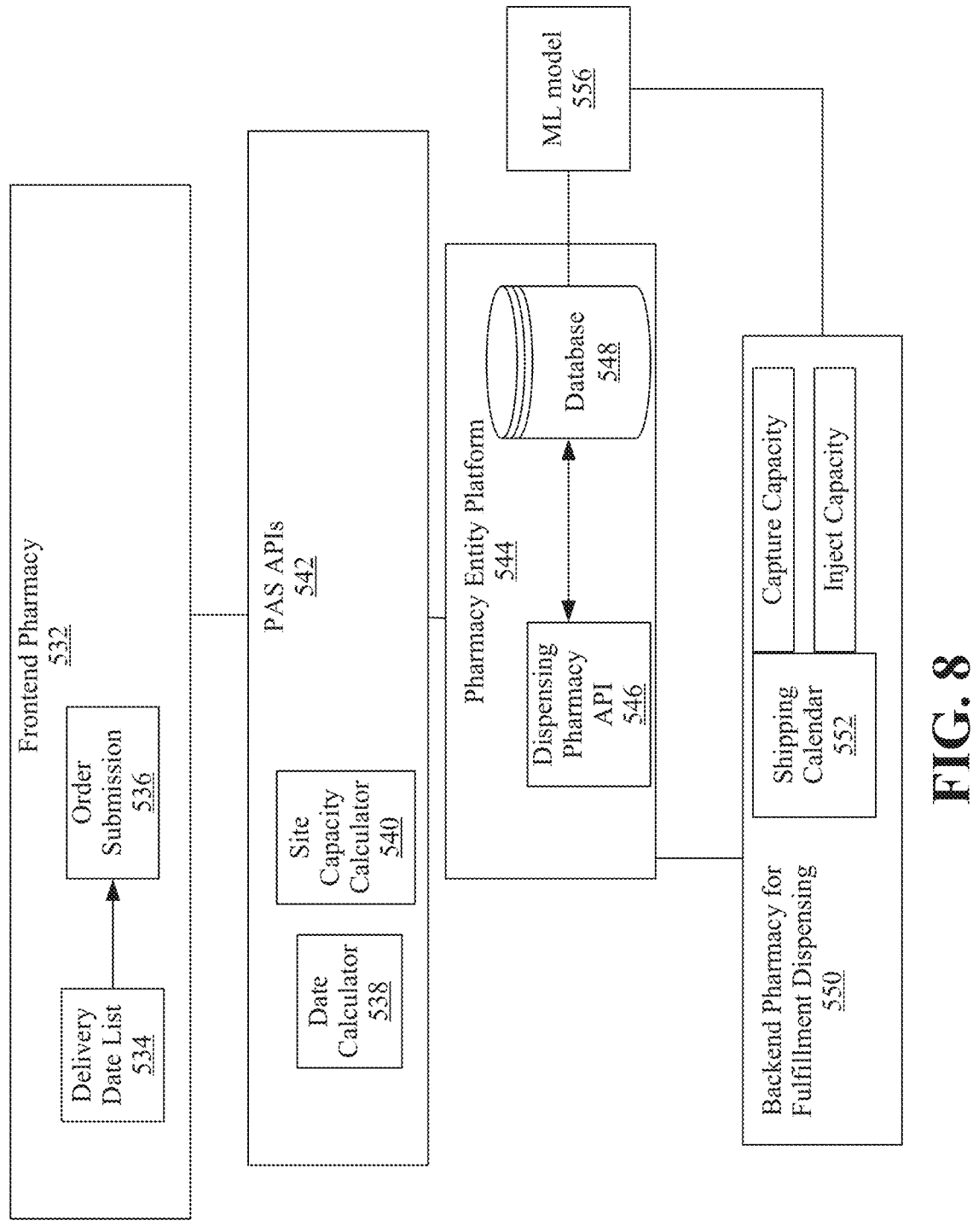
FIG. 8 is a block diagram of an example of a pharmacy dispensation architecture according to an embodiment.

FIG. 8 illustrates a pharmacy dispensation architecture 530 to process medications. The pharmacy dispensation architecture 530 can generally be implemented in conjunction with any of the embodiments described herein, for example the smart scheduling process 100 (FIGS. 1A and 1B), process 300 (FIG. 2), method 320 (FIG. 3), method 400 (FIG. 4), method 420 (FIG. 5), method 440 (FIG. 6) and/or prescription refill processing architecture 500 (FIG. 7). A frontend pharmacy 532 includes a delivery date list 534 and order submission 536. The order submission 536 may have been submitted by a user through a GUI on a user device. A Progress Application Server (PAS) API 542 includes a date calculator 538 and a site capacitor calculator 540 to calculate capacities of various fulfillment sites. A pharmacy entity platform 544 includes a dispensing pharmacy API 546 and database 548 that contains the capacity data of all fulfillment sites (e.g., pharmacies) and all medications being shipped by the fulfillment sites.

An ML model 556 (e.g., a multi-node network) can train based on the data in the database 548. Thus, data can be harvested and analyzed by the ML model 556 to train the ML model 556. A backend pharmacy for fulfillment dispensing 550 can further maintain a shipping calendar 552 and interface with the ML model 556. For example, the multi-node network 554 can provide pharmacy site capacity limits to train the ML model 556. In some examples, the ML model 556 can be further trained on different therapies/prescriptions to identify timing to fill such therapies/prescriptions and which pharmacies fill such therapies/prescriptions.

The ML model 556 can be trained by minimizing a loss function based on one or more ground-truth types to generate predictions for site capacities and distribute prescription fulfillment requests. The ML model 556 can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, and the like. The ML model 556 can be readily substituted for the ML prediction model 120 (FIG. 1A).

Figure 9:
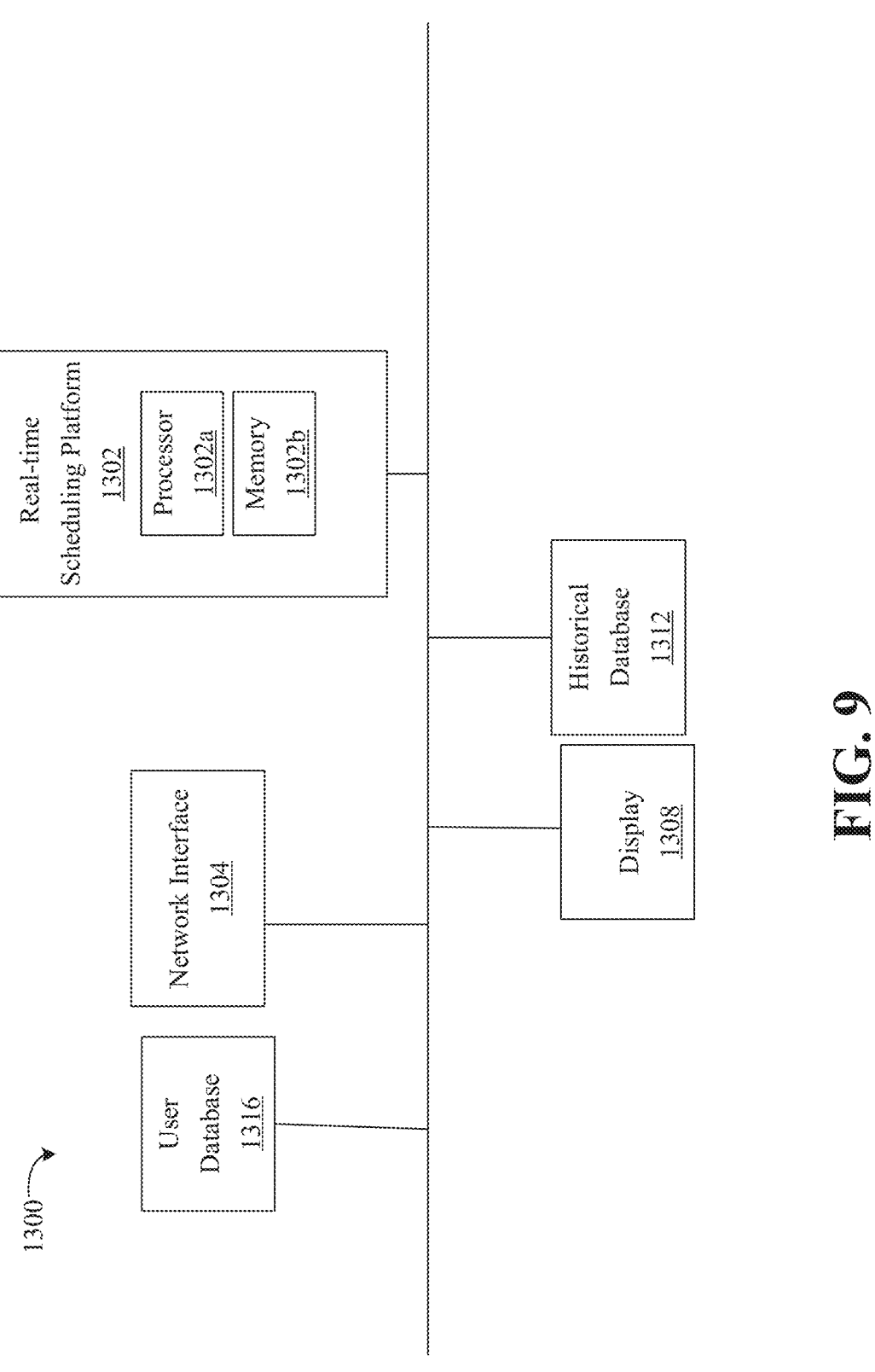
FIG. 9 is a block diagram of an example of a computing system according to an embodiment.

FIG. 9 shows a more detailed example of a computing system 1300 to predict site capacities and allocate prescription fulfillment requests accordingly. The illustrated computing system 1300 can be readily implement aspects related to, for example, the smart scheduling process 100 (FIGS. 1A and 1B), process 300 (FIG. 2), method 320 (FIG. 3), method 400 (FIG. 4), method 420 (FIG. 5), method 440 (FIG. 6), prescription refill processing architecture 500 (FIG. 7) and/ or pharmacy dispensation architecture 530 (FIG. 8).

In the illustrated example, the computing system 1300 can include a network interface 1304 that can communicate with external devices (e.g., mobile devices, computers, smart watches, IoT devices, etc.) to receive communications for a user and requests to provide medication. The network interface 1304 can also interface with websites, weather sites, local news sites, national new sites etc. to identify factors that can impact site capacities associated with a pharmacy. The computing system 1300 also includes a display 1308 (e.g., audio and/or visual interface) to present the requests. A user database 1316 stores user data, including whether the user requested the medication in the past and if a refill is needed for the medication by a certain date. A historical database 1312 further includes historical data relating to the pharmacy. Other databases can be included.

A real-time scheduling platform 1302 includes a processor 1302a (e.g., embedded controller, central processing unit/CPU) and a memory 1302b (e.g., non-volatile memory/ NVM and/or volatile memory) containing a set of instructions, which when executed by the processor 1302a, cause the controller 1302 to implement any of the aspects described herein. For example, the controller 1302 can receive an electronic request from a user device of a user to fill a prescription, identify that the prescription is associated with a first medicine, identify a first pharmacy that is capable of providing the first medicine, determine predicted site capacities for the first pharmacy for a plurality of dates, determine a subset of dates from the plurality of dates based on the site capacities, determine delivery dates for the first medicine based on the subset of dates, and provide the delivery dates to the user device. The real-time scheduling platform 1302 can further determine the predicted site capacities based on local weather forecasts associated with the first pharmacy. The real-time scheduling platform 1302 can further determine the predicted site capacities based on predicted local events associated with a location of the first pharmacy. The real-time scheduling platform 1302 can further determine the predicted site capacities based on predicted national events. The real-time scheduling platform 1302 can further determine the predicted site capacities based on historical data associated with the first pharmacy. The real-time scheduling platform 1302 can further determine the predicted site capacities based on employee data. The real-time scheduling platform 1302 can further determine, with a ML prediction model, the predicted site capacities based on one or more of historical data, weather data, employee data, local events associated with the first pharmacy or national events associated with the first pharmacy.

In some examples, the real-time scheduling platform 1302 can further transmit, with the network interface 1304, the delivery dates to the user via an application programming interface. The real-time scheduling platform 1302 can further receive, with the network interface 1304, a user selection of a first date of the delivery dates via the application programming interface. The real-time scheduling platform

1302 can further identify amounts of existing pharmacy orders for the plurality of dates, and determine remaining site capacities based on the amounts of existing pharmacy orders and the predicted site capacities, where, to determine the subset of dates the real-time scheduling platform 1302 further determines that the subset of dates have remaining site capacities of the remaining site capacities that are above a threshold. In such examples, the real-time scheduling platform 1302 can further predict, with a ML model, an amount of emergency orders that will be placed in the future for the first pharmacy, and set the threshold based on the amount of emergency orders. The real-time scheduling platform 1302 can further access a user database to retrieve user data, where the user data includes a previous fulfillment date for the prescription, and determine the subset of dates based on the previous fulfillment date. The real-time scheduling platform 1302 can further determine that the first pharmacy has a license to dispense the first medicine, determine that a second pharmacy does not have a license to dispense the first medicine, select the first pharmacy to fill the prescription based on the first pharmacy having the license, and determine that the second pharmacy is to be bypassed for filling the prescription based on the second pharmacy not having the license. The real-time scheduling platform 1302 can further identify that a user preference associated with the user indicates a user selection of a second pharmacy to provide medicine, determine that the second pharmacy is unable to fill the prescription within a window of time, and determine that the first pharmacy is able to fill the prescription in the window of time, provide an indication to the user that the second pharmacy is unable to fill the prescription and the first pharmacy is able to fill the prescription, receive a reply to the indication from the user device, determine that the reply includes a consent to receive the first medicine from the first pharmacy, and determine that the first pharmacy is to be selected to fill the prescription based on the consent. The real-time scheduling platform 1302 can further train a ML model to determine the predicted site capacities. The real-time scheduling platform 1302 can further determine the predicted site capacities, the subset of dates and the delivery dates in real-time. The real-time scheduling platform 1302 can further generate correlations between different dates and site capacities, and determine the predicted site capacities based on the correlations. The real-time scheduling platform 1302 can further provide the delivery dates to the user device through an application programming interface, where the first pharmacy is a home delivery pharmacy.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

I claim:

1. A computing system comprising:

a processor, and a memory having a set of instructions, which when executed by the processor, cause the computing system to:

receive an electronic request from a user device of a user to fill a prescription;

identify that the prescription is associated with a first medicine;

identify, in real-time, a first pharmacy that is capable of shipping the first medicine to a delivery location of the user;

determine, in real-time, predicted site capacities for the first pharmacy for a plurality of dates;

map, in real-time, a predicted shipping path to ship the first medicine from the first pharmacy to the delivery location of the user;

predict, in real-time, whether a future disruption along the predicted shipping path will delay shipment of the first medicine along the predicted shipping path;

determine, in real-time, a subset of dates from the plurality of dates based on the site capacities and the future disruption to reduce one or more of spoilage or waste of the first medicine during shipment of the first medicine to the delivery location;

determine, in real-time, delivery dates for the first medicine based on the subset of dates; and provide, in real-time, the delivery dates to the user device.

2. The computing system of claim 1, wherein the instructions of the memory, when executed, cause the computing system to:

predict the future disruption based on local weather forecasts associated with the shipping path, wherein the first pharmacy is a mail order pharmacy.

3. The computing system of claim 1, wherein to determine the predicted site capacities, the instructions of the memory, when executed, cause the computing system to:

predict the predicted site capacities based on predicted local events associated with a location of the first pharmacy.

4. The computing system of claim 1, wherein to determine the predicted site capacities, the instructions of the memory, when executed, cause the computing system to:

predict the predicted site capacities based on predicted national events.

5. The computing system of claim 1, wherein to determine the predicted site capacities, the instructions of the memory, when executed, cause the computing system to:

predict the predicted site capacities based on historical data associated with the first pharmacy.

6. The computing system of claim 1, wherein to determine the predicted site capacities, the instructions of the memory, when executed, cause the computing system to:

predict the predicted site capacities based on employee data.

7. The computing system of claim 1, wherein to determine the predicted site capacities, the instructions of the memory, when executed, cause the computing system to:

determine, with a machine learning prediction model, the predicted site capacities based on one or more of historical data, weather data, employee data, local events associated with the first pharmacy or national events associated with the first pharmacy.

8. The computing system of claim 1, wherein the instructions of the memory, when executed, cause the computing system to:

transmit the delivery dates to the user via an application programming interface.

9. The computing system of claim 1, wherein the instructions of the memory, when executed, cause the computing system to:

receive a user selection of a first date of the delivery dates via an application programming interface; and send the first medicine based on the user selection of the first date.

10. The computing system of claim 1, wherein the instructions of the memory, when executed, cause the computing system to:

identify amounts of existing pharmacy orders for the plurality of dates; and determine remaining site capacities based on the amounts of existing pharmacy orders and the predicted site capacities;

wherein, to determine the subset of dates, the instructions of the memory, when executed, cause the computing system to determine that the subset of dates have remaining site capacities of the remaining site capacities that are above a threshold.

11. The computing system of claim 10, wherein the instructions of the memory, when executed, cause the computing system to:

predict, with a machine learning model, an amount of emergency orders that will be placed in the future for the first pharmacy; and set the threshold based on the amount of emergency orders.

12. The computing system of claim 1, wherein the instructions of the memory, when executed, cause the computing system to:

access a user database to retrieve user data, wherein the user data includes a previous fulfillment date for the prescription; and determine the subset of dates based on the previous fulfillment date.

13. The computing system of claim 1, wherein the instructions of the memory, when executed, cause the computing system to:

determine that the first pharmacy has a license to dispense the first medicine;

determine that a second pharmacy does not have the license to dispense the first medicine;

select the first pharmacy to fill the prescription based on the first pharmacy having the license; and determine that the second pharmacy is to be bypassed for filling the prescription based on the second pharmacy not having the license.

14. The computing system of claim 1, wherein the instructions of the memory, when executed, cause the computing system to:

identify that a user preference associated with the user indicates a user selection of a second pharmacy to provide medicine;

determine that the second pharmacy is unable to fill the prescription within a window of time;

determine that the first pharmacy is able to fill the prescription in the window of time;

provide an indication to the user that the second pharmacy is unable to fill the prescription and the first pharmacy is able to fill the prescription;

receive a reply to the indication from the user device;

determine that the reply includes a consent to receive the first medicine from the first pharmacy; and determine that the first pharmacy is to be selected to fill the prescription based on the consent.

15. The computing system of claim 1, wherein the instructions of the memory, when executed, cause the computing system to:

train a machine learning model to determine the predicted site capacities.

16. The computing system of claim 1, wherein the instructions of the memory, when executed, cause the computing system to:

generate correlations between different dates and site capacities, and wherein to determine the predicted site capacities, the instructions of the memory, when executed, cause the computing system to determine the predicted site capacities based on the correlations.

17. The computing system of claim 1, wherein the first pharmacy is a home delivery pharmacy.

18. At least one non-transitory computer readable storage medium comprising a set of instructions, which when executed by a computing system, cause the computing system to:

receive an electronic request from a user device of a user to fill a prescription;

identify that the prescription is associated with a first medicine;

identify, in real-time, a first pharmacy that is capable of shipping the first medicine to a delivery location of the user;

determine, in real-time, predicted site capacities for the first pharmacy for a plurality of dates;

map, in real-time, a predicted shipping path to ship the first medicine from the first pharmacy to the delivery location of the user;

predict, in real-time, whether a future disruption along the predicted shipping path will delay shipment of the first medicine along the predicted shipping path;

determine, in real-time, a subset of dates from the plurality of dates based on the site capacities and the future disruption to reduce one or more of spoilage or waste of the first medicine during shipment of the first medicine to the delivery location;

determine, in real-time, delivery dates for the first medicine based on the subset of dates; and provide, in real-time, the delivery dates to the user device.

19. A method comprising:

receiving an electronic request from a user device of a user to fill a prescription;

identifying that the prescription is associated with a first medicine;

identifying, in real-time, a first pharmacy that is capable of providing the first medicine to a delivery location of the user;

determining, in real-time, site capacities for the first pharmacy for a plurality of dates;

mapping, in real-time, a predicted shipping path to ship the first medicine from the first pharmacy to the delivery location of the user;

predicting, in real-time, whether a future disruption along the predicted shipping path will delay shipment of the first medicine along the predicted shipping path;

determining, in real-time, a subset of dates from the plurality of dates based on the site capacities and the future disruption to reduce one or more of spoilage or waste of the first medicine during shipment of the first medicine to the delivery location;

determining, in real-time, delivery dates for the first medicine based on the subset of dates; and providing, in real-time, the delivery dates to the user device.

* * * * *